UNITED STATES PATENT OFFICE.

CHRISTOPHER RIS, OF BASLE, SWITZERLAND, ASSIGNOR TO JOHN R. GEIGY & CO., OF SAME PLACE.

BROWN DIAZO DYE AND METHOD OF MAKING SAME.

SPECIFICATION forming part of Letters Patent No. 567,413, dated September 8, 1896.

Application filed March 3, 1896. Serial No. 581,652. (Specimens.) Patented in France October 2, 1895, No. 250,697.

*To all whom it may concern:*

Be it known that I, CHRISTOPHER RIS, a citizen of the Swiss Confederation, residing at Basle, in the Republic of Switzerland, have invented certain new and useful Improvements in Processes for the Production of Brown Diazo Dyes, (for which Letters Patent were granted to me in France, No. 250,697, dated October 2, 1895,) of which the following is a specification.

My invention relates to the production of a new coloring-matter which produces a very fast and intense brown shade upon unmordanted cotton. This coloring-matter belongs to the class of mixed diazo dyestuffs and is obtained by the combination of the tetrazo compound of benzidin or tolidin or diamidoethoxydiphenyl or diamidodiphenol ether with two substances, one of which is alkylated $beta_1$-$alpha_4$-amidonaphthol-$beta_3$-sulfo-acid, while the other is salicylic or cresotinic acid. The products obtained from these homologous substances are so similar as to be practically identical.

The chemical constitution of the new dye is indicated by the following formula:

In the following I give an example of the production of the coloring-matter: 18.4 kilos of benzidin are diazotized in the usual manner, then combined with a solution containing fourteen kilos of salicylic acid and thirty kilos of carbonate of sodium. The intermediary compound which is formed is added after some hours to an alkaline solution of 26.7 kilos of alkylated $beta_1$-$alpha_4$-amidonaphthol-$beta_3$-sulfo-acid, after which the coloring-matter is filtered off and dried. It forms a dark-brown powder, readily soluble in water, with a dark-brown color. It dissolves in concentrated sulfuric acid with a violet-blue color. The aqueous solution is precipitated by acids in claret-colored flocks and by the action of reducing agents to a slightly brown-colored solution.

Having thus described my invention, I claim as new and desire to secure by Letters Patent—

1. The process herein described of making a brown dyestuff, which is obtained by combining the tetrazo compound of benzidin with salicylic acid and with alkylated $beta_1$-$alpha_4$-amidonaphthol-$beta_3$-sulfo-acid, substantially as set forth.

2. The brown coloring-matter herein described, being a dark-brown powder, readily soluble in water with a dark-brown color, soluble in concentrated sulfuric acid with a violet-blue color, precipitated by acids in claret-colored flocks and decomposed by reducing agents to a slightly brown-colored solution substantially as set forth.

In testimony that I claim the foregoing as my invention I have signed my name in presence of the subscribing witnesses.

CHRISTOPHER RIS.

Witnesses:
C. A. BURCKHARDT,
CHARLES BURCKHARDT,
GEORGE GIFFORD.